(No Model.)
F. M. LECHNER.
SPROCKET WHEEL.
No. 259,875. Patented June 20, 1882.
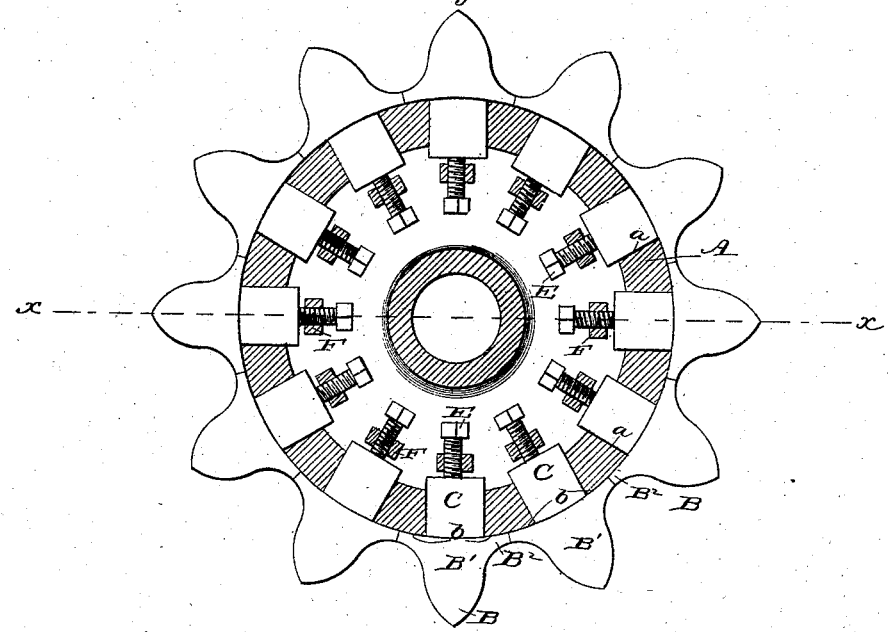
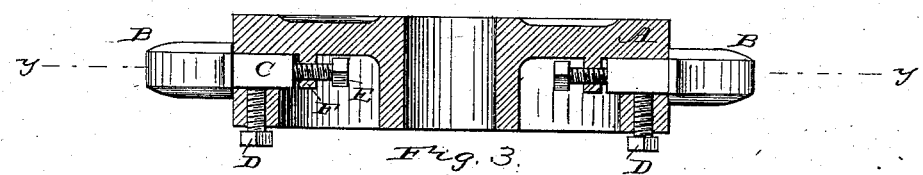
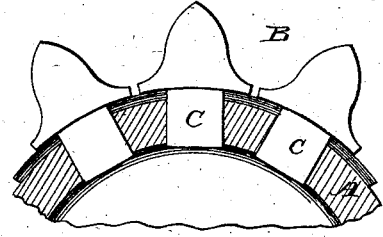 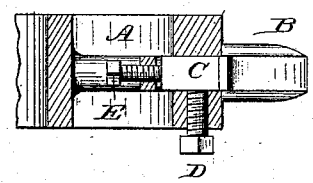
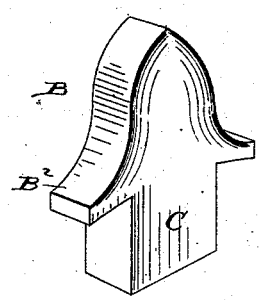
Witnesses:
H. N. Low
J. S. Barker.
Inventor:
Francis M. Lechner
by Doubleday & Bliss
Attys.

UNITED STATES PATENT OFFICE.

FRANCIS M. LECHNER, OF COLUMBUS, OHIO.

SPROCKET-WHEEL.

SPECIFICATION forming part of Letters Patent No. 259,875, dated June 20, 1882.

Application filed May 2, 1882. (No model.)

*To all whom it may concern:*

Be it known that I, FRANCIS M. LECHNER, a citizen of the United States, residing at Columbus, in the county of Franklin and State of Ohio, have invented certain new and useful Improvements in Sprocket-Wheels, of which the following is a specification, reference being had therein to the accompanying drawings.

Figure 1 is a section through a wheel having my improvements, it being taken on line $y\ y$, Fig. 2, at right angles to the axis of the wheel. Fig. 2 is a section of the wheel on the line $x\ x$, Fig. 1. Fig. 3 is a section of a portion of the wheel with a modified form of the adjusting device. Fig. 4 shows the method of embodying my improvements in another form of wheel. Fig. 5 is a perspective of one of the teeth detached.

Heretofore it has been customary to make the wheels which are operated by sprocket-chains by casting the sprocket-teeth in one piece with the body of the wheel. The chains and wheels are liable to much wear, especially those parts which come in contact with each other. When the parts have thus become worn there is a slackness or looseness between the wheels and chains which is very disadvantageous, and which it is my purpose to obviate. My improved wheel is so constructed that that portion thereof which engages with the chain can be expanded or have its circumference enlarged, so that when any wear occurs there shall be no looseness of the chain.

In the drawings, A represents the rim or perimeter of a wheel constructed with my improvement. The perimeter may be cast with or separately from and afterward attached to the radial part or ribs or spoke portion. Heretofore wheels of this kind have been cast with the sprockets and perimeters in one and the same piece of metal. In my construction the sprockets are formed separately from the wheel, and are detachably secured thereto by means of perforations or apertures formed in the perimeter at those points where it is desired to have lugs or teeth to engage with the chain. In the drawings the apertures for this purpose are shown at $a$.

B B are the sprocket-teeth. They are in outline of substantially the form shown in my Patent No. 257,445 dated May 2, 1882, except that in said patent they are continuous with the rim of the wheel. In this case I have shown them as having the main chain engaging part B' and the laterally-projecting lugs $B^2$. The inner surface, $b$, of the engaging part conforms substantially to the periphery of the rim A of the wheel. With the engaging part of the sprocket there is formed a stem or shank, C, adapted to pass into or through the apertures $a$ in the perimeter.

The lugs or sprocket-teeth are held in position by means of clamping set-screws D, which are mounted in the periphery of the wheel in such manner that they can be thrust inward at an angle to the stem C. These set-screws prevent the lugs or teeth from slipping outward longitudinally in whatever position they (the teeth) may be relatively to the wheel. It will be seen that when the teeth are thus attached they can be moved to different distances from the center of the wheel, and therefore they permit the use of a somewhat longer chain than can be used if this expansiveness or variation of the distances of the teeth from the center were not possible.

I have shown one or two forms of the devices which can be combined with the parts already described for providing an accurate adjustment of the position of the teeth, though it will be readily understood that other forms will suggest themselves to those acquainted with such matters without departing from the spirit of my invention.

In Figs. 1 and 2 the adjustment of the teeth is accomplished by means of set-screws E, each of which is situated on substantially the central longitudinal line of the tooth or lug with which it is combined. These set-screws have their heads turned toward the center of the wheel, and therefore by being thrust outward they will push against the shanks or stems C, and can be used to push the teeth or lugs out if the set-screws D are first released. After the teeth have been adjusted in position, as circumstances may require, they are again clamped by means of set-screws D.

The adjusting-screws E may be supported by means of a circular or annular flange, F, cast with the web or spokes of the wheel, or they may be mounted in stationary lugs cast therewith or secured thereto.

Instead of the set-screws E E, use may be made of lining pieces or washers of metal or other suitable material between the expanded parts $B^2$ of the teeth and the periphery of the wheel. These prevent a drawing inward of the teeth, which the chain tends to produce, the set-screws D operating, as in the construction above described, to prevent an outward movement.

The parts $B^2$ of the adjacent teeth are in such proximity that the end bars of the links of the chain, or the anti-friction rollers on the said end bars, shall have a substantially smooth bearing-surface on the teeth in whatever position the teeth may be adjusted. When the teeth are in position in the wheel the said parts $B^2$ of the adjacent teeth project toward each other far enough to form a support to prevent the end bars or the rollers carried thereby from coming in contact with the wheel, so that there shall be no wear on the wheel, the teeth receiving the wearing action.

I am aware that gear-wheels for meshing with other wheels have been heretofore constructed with removable teeth, and that with such teeth have been combined wedges, said wedges being inserted into the apertures which receive the teeth, and that set-screws have also been used to hold the wedges in position, the set-screws having a threaded connection with the shanks of the gear-teeth; but I am not aware that it has been heretofore customary to employ in sprocket-wheels for engaging with chains teeth which could be at any time moved longitudinally toward and from the center of the wheel to effect a delicate adjustment, so that any slack in the chain could be taken up.

It will be seen that the flanges or lugs which support the adjusting devices are carried by the wheel entirely independently of the teeth and of the devices which clamp the teeth. Therefore the teeth can be moved at any time, regardless of the adjusting devices. The aforesaid removable gear-teeth heretofore used have had shanks which were not formed with unbroken continuous surfaces, but with recesses or grooves adapted to engage with lugs projecting from the walls of the apertures in which they were placed for the purpose of preventing entirely the very movement at which I aim—to wit, a longitudinal movement of the tooth in or out from the center of the wheel. In my construction the stem or shank C of the tooth has continuous unbroken surfaces $c$ $c'$ $c^2$ $c^3$, which fit as snugly as possible the aperture $a$, the walls of which are also smooth or unbroken. The stem or shank has in cross-section the same dimensions at one point that it has at another, so that in whatever position the tooth may be relatively to the center of the wheel the relations of its outer surfaces to the walls will be substantially the same, as no wedging-surfaces are employed, the clamping action being produced by the screws situated to bear at an angle directly against the side of the stem and supported independently thereof, so that the tooth can be removed without removing the clamping devices.

What I claim is—

1. The combination, with a sprocket-wheel having the aperture $a$ in the rim, of the longitudinally-movable tooth having the shank C constructed to fill the said aperture, adjusting devices to move the stem longitudinally in said aperture, and clamping devices to secure the tooth after adjustment, substantially as set forth.

2. The combination, with a sprocket-wheel having an aperture, $a$, in its rim with continuous unbroken walls, of a longitudinally-adjustable sprocket-tooth having a stem formed with corresponding unbroken surfaces, substantially as set forth.

3. In a sprocket-wheel, the combination, with a longitudinally-adjustable tooth, of a screw for moving the tooth longitudinally and a clamping device for preventing the longitudinal movement of the tooth, substantially as set forth.

4. In a sprocket-wheel, the combination, with a perforated rim and lugs or flanges supported upon the wheel independently of and inside of said rim, of the sprocket-teeth having the parts C seated in the perforations in the rim, and the adjusting devices supported independently of the teeth in the aforesaid inner lugs or flanges, substantially as set forth.

5. In a sprocket-wheel, a tooth having the shank C formed with continuous unbroken walls, a clamping-screw, D, bearing against the side of the shank, and the adjusting-screw E, bearing against the end of the shank and supported upon the wheel independently of the tooth, substantially as set forth.

6. The combination, with the sprocket-wheel having apertures in the rim, of the adjustable and removable teeth and the adjusting devices supported upon the wheel independently of the teeth, whereby the teeth can be removed without removing the adjusting devices, substantially as set forth.

7. The herein-described detachable sprocket-tooth, having the projections $B^2$ extending laterally on both sides of the tooth and adapted to prevent the chain from coming in contact with the wheel, substantially as set forth.

8. In a sprocket-wheel, a tooth which can be adjusted longitudinally in several positions relatively to the center of the wheel to vary the tension of a chain, in combination with clamping devices adapted to secure the tooth in said several positions, or relatively to the center of the wheel, substantially as set forth.

In testimony whereof I affix my signature in presence of two witnesses.

FRANCIS M. LECHNER.

Witnesses:
H. B. ALBERY,
F. W. ARNOLD.